United States Patent
Van Veen et al.

(10) Patent No.: US 12,262,159 B2
(45) Date of Patent: Mar. 25, 2025

(54) PRESETTING EQUALIZER FOR BURST MODE OPTICAL RECEIVER

(71) Applicant: Nokia Solutions and Networks Oy, Espoo (FI)

(72) Inventors: Doutje Van Veen, New Providence, NJ (US); Vincent Houtsma, New Providence, NJ (US)

( * ) Notice: Subject to any disclaimer, the term of this patent is extended or adjusted under 35 U.S.C. 154(b) by 174 days.

(21) Appl. No.: 18/129,201

(22) Filed: Mar. 31, 2023

(65) Prior Publication Data

US 2024/0334093 A1  Oct. 3, 2024

(51) Int. Cl.
 *H04Q 11/00* (2006.01)
 *H04B 10/69* (2013.01)
 *H04L 25/02* (2006.01)

(52) U.S. Cl.
 CPC ....... *H04Q 11/0066* (2013.01); *H04L 25/022* (2013.01); *H04B 10/6971* (2013.01)

(58) Field of Classification Search
 None
 See application file for complete search history.

(56) References Cited

U.S. PATENT DOCUMENTS 8,023,402 B2 *  9/2011  Roberts ................. H04B 10/60
  398/147
 10,038,506 B2 *  7/2018  Crivelli .............. H04B 10/6161
(Continued)

FOREIGN PATENT DOCUMENTS

WO   WO 2022/015305   1/2022

OTHER PUBLICATIONS

Minghui Tao Huawei Technologies China, "An ONU Activation Process for G.hsp TC", ITU-T Draft; Study Period 2017-2020, Study Group 15, International Telecommunication Union, Geneva; CH, vol. 2/15, Oct. 20, 2019, pp. 1-3.

(Continued)

*Primary Examiner* — Jai M Lee
(74) *Attorney, Agent, or Firm* — CAPITAL PATENT & TRADEMARK LAW FIRM, PLLC

(57) ABSTRACT

A technique for presetting the tap values of the equalizer component of an OLT burst mode receiver is used to eliminate (or at least shorten) the conventional equalizer training period, which is known to delay the ability to transmit useful data from the ONU to the OLT. The disclosed technique is based on a collection of three known frequency responses: (1) the ONU transmitter response $F_T(f)$; (2) the OLT receiver response $F_R(f)$; and (3) a specific fiber frequency response $F_F(f)$ calculated for the span connecting the transmitter and receiver. $F_T(f)$ and $F_R(f)$ are known quantities measured during component testing prior to installation. The frequency response of the fiber span may be determined by a combination of the known ONU transmitter measurements with a measurement of the separation between the ONU and the OLT ("reach") created during a previous activation (ranging) process.

10 Claims, 8 Drawing Sheets

(56) References Cited

U.S. PATENT DOCUMENTS 11,539,437 B2 * 12/2022 Iiyama .................. H04B 10/60
2018/0316433 A1 * 11/2018 Castro ................ H04B 10/6163

OTHER PUBLICATIONS

Takuya Kanai FTT Japan: "Pre-Calculation Scheme for Application of DSP Technology", ITU-T Draft; Study Period 2017-2020, Study Group 15; Series C-XXXX, International Telecommunication Union, Geneva; CH, vol. 2/15, Jul. 1, 2020, pp. 1-3.

* cited by examiner

RECEIVED SIGNAL AFTER Rx WITH NOISE

FFE FREQUENCY SPECTRUM

RECEIVER
EQUALIZER TAP SETTINGS
$F_R(f)$

PRESETTING EQUALIZER FOR BURST MODE OPTICAL RECEIVER

TECHNICAL FIELD

Embodiments of the present disclosure are generally related to the field of passive optical networks (PONs) and, more specifically, to the provision of a technique for creating equalizer settings for an optical receiver that minimizes the need for active training in order to accurately recover high line rate burst mode transmissions.

BACKGROUND

Newer generations of passive optical networks will be based upon a transmission rate of 50 Gb/s ("50G"). The developing standards for a 50G PON presume the use of a receiver configuration that includes some type of electronic equalization (digital signal processor (DSP)-based, for example) that will compensate for channel nonlinearities, chromatic dispersion and noise, as well as the response limitations of standard photodiodes that provide the initial conversion from a received 50G optical signal into an electrical equivalent.

At the proposed upstream line rate of 50G (and, eventually, higher line rates), the burst mode receiver at an optical line terminal (OLT) needs to quickly equalize the upstream bursts it receives from an optical network unit (ONU) before data can be accurately recovered. While there exist techniques for training the equalizer component of an OLT burst mode receiver to compensate for the non-ideal response associated with the reception of network-supported 50G transmissions, they require a relatively long time interval to develop the required filter characteristics. Since the equalizer configuration is under constant update and not yet optimal during this training period, accurate transmission of data from the ONU to the OLT is not possible until the equalizer training process is completed.

SUMMARY

Disclosed is a technique for determining a priori an initial group of tap settings for the equalizer element within an OLT burst mode receiver. The settings are based on existing data collected during component testing in combination with ranging measurements performed during a previous ONU activation process.

In accordance with the principles of the present disclosure, it is proposed to utilize a cascaded collection of known frequency responses for the ONU transmitter and the OLT receiver, as the fiber network connecting the transmitter and receiver. The ONU transmitter frequency response is a known quantity found during component testing prior to installation. Similarly, the OLT receiver frequency response has been previously determined using a predefined "known/golden" transmitter commonly used for this purpose. The frequency response of the fiber network may be determined by a combination of the known ONU transmitter measurements with a measurement of the separation between the ONU and the OLT ("reach") created during a previous activation (ranging) process.

An example embodiment of the present disclosure may be configured as a method of generating a plurality of N preset tap values for an equalizer element component of an optical receiver, where the equalizer element is configured to provide accurate recovery of burst mode data transmitted by a new optical transmitter. In this example embodiment, the method comprises: retrieving time-based performance data associated with the new optical transmitter (including performance data previously obtained for direct transmission between the new optical transmitter and a known receiver (TDEC(0)) and performance data previously obtained for worst-case transmission of a maximum fiber length between the new optical transmitter and the known receiver (TDEC(max))); generating an inverse of TDEC(0) to create a transmitter frequency response $F_T(f)$; creating a first plurality of N equalizer tap values for equalizing the transmitter frequency response $F_T(f)$; determining a fiber network frequency response by subtracting the inverse of TDEC(0) from the inverse of TDEC(max), and creating a set of intermediate tap values therefrom; retrieving stored channel length information for a measured fiber span between the new optical transmitter and the optical receiver installed within the optical network; modifying the determined fiber network frequency response by a factor including the channel length information to create a fiber channel frequency response $F_F(f)$; creating a second plurality of N equalizer tap values for equalizing the fiber channel frequency response $F_F(f)$; obtaining a frequency response measurement $F_R(f)$ of the optical receiver installed within the optical network; creating a third plurality of N equalizer tap values for equalizing the optical receiver frequency response $F_R(f)$; and combining the first, second, and third pluralities of N equalizer tap values to create the plurality of N preset taps values for use by the equalizer element within the optical receiver.

Another example of the present disclosure may be embodied as apparatus that is particularly configured to create preset tap values for an equalizer included within an optical receiver (the optical receiver responsive to incoming burst mode transmissions from a newly-installed optical transmitter). Here, the apparatus comprises a processor and a memory coupled to the processor. The process having instructions stored therein, which when executed by the processor, cause the apparatus to perform acts of: retrieving time-based performance data associated with the new optical transmitter (including performance data previously obtained for direct transmission between the new optical transmitter and a known receiver (TDEC(0)) and performance data previously obtained for worst-case transmission of a maximum fiber length between the new optical transmitter and the known receiver (TDEC(max))); generating an inverse of TDEC(0) to create a transmitter frequency response $F_T(f)$; creating a first plurality of N equalizer tap values for equalizing the transmitter frequency response $F_T(f)$; determining a fiber network frequency response by subtracting the inverse of TDEC(0) from the inverse of TDEC(max), and creating a set of intermediate tap values therefrom; retrieving stored channel length information for a measured fiber span between the new optical transmitter and the optical receiver installed within the optical network; modifying the determined fiber network frequency response by a factor including the channel length information to create a fiber channel frequency response $F_F(f)$; creating a second plurality of N equalizer tap values for equalizing the fiber channel frequency response $F_F(f)$; obtaining a frequency response measurement $F_R(f)$ of the optical receiver installed within the optical network; creating a third plurality of N equalizer tap values for equalizing the optical receiver frequency response $F_R(f)$; and combining the first, second, and third pluralities of N equalizer tap values to create the plurality of N preset taps values for use by the equalizer element within the optical receiver.

Other and further aspects will become apparent during the course of the following discussion and by reference to the accompanying drawings.

BRIEF DESCRIPTION OF THE DRAWINGS

Referring Now to the Drawings,

FIG. 2 contains diagrams associated with pre-installation testing of a new ONU, where

DETAILED DESCRIPTION

The latest passive optical network (PON) standards that have been proposed feature a 50 Gb/s ("50G") line rate as the network-supported line rate for upstream burst mode transmissions. At this speed, digital signal processing in the form of equalization is required at the receiver end to compensate for the effects of chromatic dispersion (and, perhaps, other channel-based distortions), as well as the bandwidth-limited responsivity of the receiver components. For upstream burst mode transmissions from optical network units (ONUs) to an optical line terminal (OLT), this means that the OLT burst mode receiver needs to equalize the upstream bursts before the data can be accurately recovered. During a conventional training process for the burst mode equalizer, it is not possible to ensure the accurate transmission of data between the ONU and OLT; thus, the need for a relatively long training window means there is an extended period of time where reliable data transmission is not possible. Additionally, the long time period necessary for a conventional training process requires the use of a large overhead for training the equalizer in each upstream burst. The disclosed approach for presetting the equalizer tap values of the OLT burst mode receiver is considered to significantly reduce, if not eliminate, the need to perform additional training of the equalizer once live data begins to be transmitted from a newly-installed ONU to the burst mode receiver at the OLT.

Figure 1:
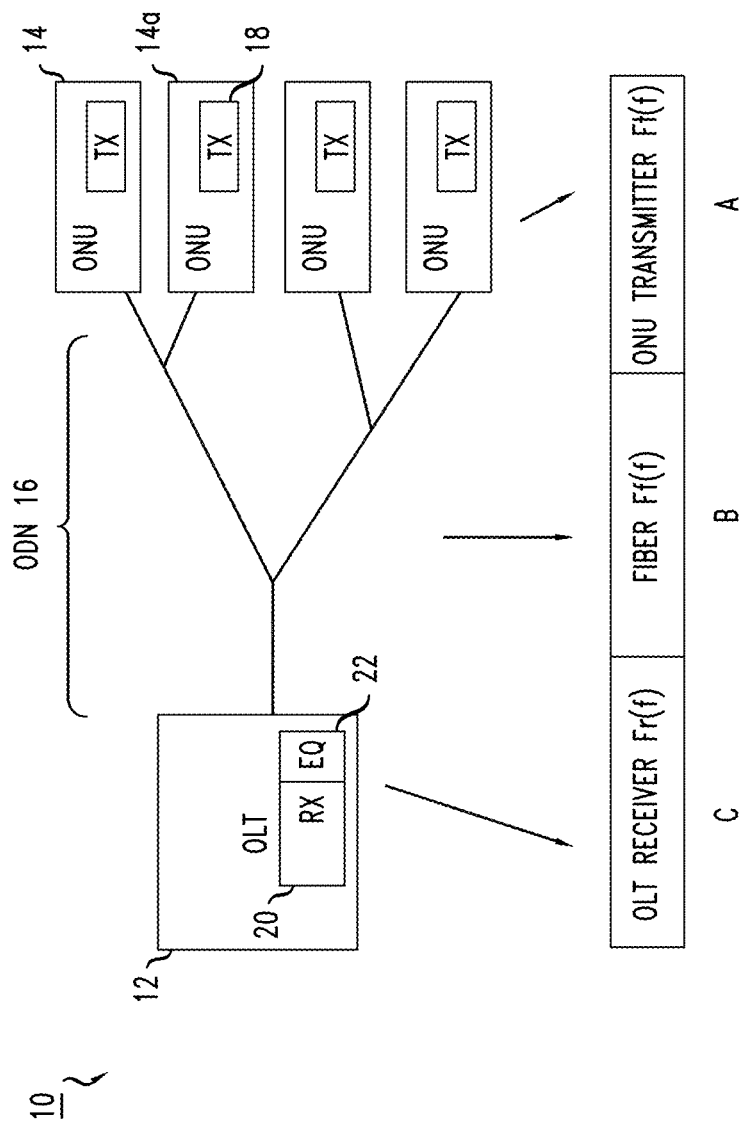
FIG. 1 is a simplified block diagram of a passive optical network, illustrating the different relevant frequency responses associated with the different segments of the PON and used in the creation of the preset equalizer tap values.

FIG. 1 shows an example architecture of a passive optical network (PON) 10 in combination with the frequency response factors used in the disclosed process to preset the equalizer tap values. As shown, PON 10 includes an OLT 12 that communicates with a plurality of ONUs 14 via a tree-and-branch type of optical distributed network (ODN) 16. In the upstream direction, the passive combiner devices within ODN 16 are used to direct burst mode transmissions from ONUs 14 to OLT 12 in a time-controlled manner well-known in the art.

For the purposes of understanding the technical details included in the present disclosure, it will be presumed that a new ONU 14a has been recently added to PON 10 and that an included transmitter 18 will be sending burst mode upstream transmissions at a network-supported high line rate (e.g., 50G) that requires a receiver 20 within OLT 12 to perform some type of equalization to properly recover the transmitted data. An equalizer element 22 is shown as included within receiver 20 at OLT 12.

Also shown in FIG. 1 is a diagram illustrating the three separate frequency response components that are used in accordance with the disclosed technique of presetting the receiver equalizer 22. A first component, denoted by the letter "A" in FIG. 1, is associated with the frequency response $F_T(f)$ of transmitter 18 of ONU 14a. Frequency response $F_T(f)$ may be found during initial testing of ONU 14a prior to its installation in PON 10. A second component, denoted by the letter "B" in FIG. 1, is associated with the frequency response of the optical signal path through ODN 16 between ONU 14a and OLT 12. Referred to as the "fiber frequency response $F_F(f)$", a combination of measurements related to transmitter 18 and specific data obtained during the activation of ONU 14a (i.e., ranging measurement) is used to develop this frequency response. Lastly, a third component, denoted by the letter "C" in FIG. 1, is associated with the frequency response $F_R(f)$ of burst mode receiver 20 within OLT 12.

As will be described in detail below, a combination of frequency responses A, B, and C (i.e., $F_T(f)$, $F_F(f)$, and $F_R(f)$) is used in accordance with the teachings of the present disclosure to fully characterize the complete channel between ONU 14a and OLT 12. The cascaded group of these frequency responses is used to estimate the inverse of channel and provide a set of initial equalizer settings that are applied to equalizer element 22 prior to initiating data communication with new ONU 14. By presetting equalizer 22, ONU 14a may transmit data using the network-supported high line rate (e.g., 50G) with its first upstream burst.

Figure 2A:
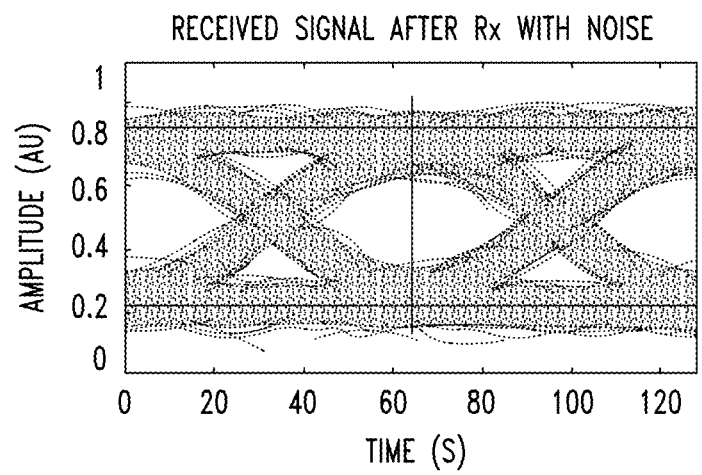
FIG. 2(a) shows a TDEC(0) graph associated with the new ONU.

FIG. 2 contains a set of diagrams that illustrate an example process for obtaining $F_T(f)$, the frequency response ONU transmitter 18 and identified as frequency response component A in FIG. 1. FIG. 2(a) is an eye diagram measurement of a test signal sent by ONU transmitter 18 to a full bandwidth, "flat-response" (known) optical receiver. The known optical receiver is a test device used to qualify ONU components prior to installation and, therefore, the measurements as shown in FIG. 2(a) are available for use in creating the preset equalizer configuration of the present disclosure. This particular measurement is commonly referred to as "transmission and dispersion eye closure"

Figure 2B:
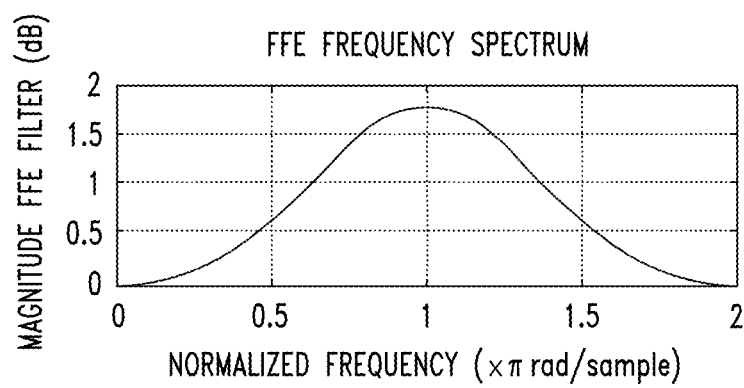
FIG. 2(b) shows the relative frequency response (inverse) of the graph of FIG. 2(a)
Figure 2C:
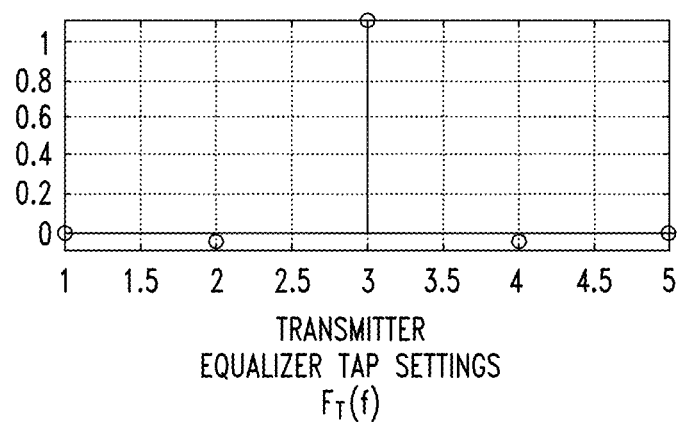
FIG. 2(c) illustrates a set of tap values $F_T(f)$ associated with the frequency response of FIG. 2(b)

(TDEC). The eye diagram as shown in FIG. 2(s) is obtained for the case where ONU transmitter 18 and the known receiver are disposed in a "back to back" (b2b) arrangement; that is, without any optical fiber coupling the devices together (and thus no channel noise or dispersion present between the transmitter and receiver). This b2b TDEC measurement is thus sometimes referred to as a "TDEC(0)" measurement. FIG. 2(b) shows the response of this known receiver, and FIG. 2(c) depicts the associated equalizer tap settings. For the purposes of the present disclosure, the equalizer tap settings shown in FIG. 2(c) define the ONU transmitter frequency response $F_T(f)$, defined as component A in FIG. 1.

Figure 3A:
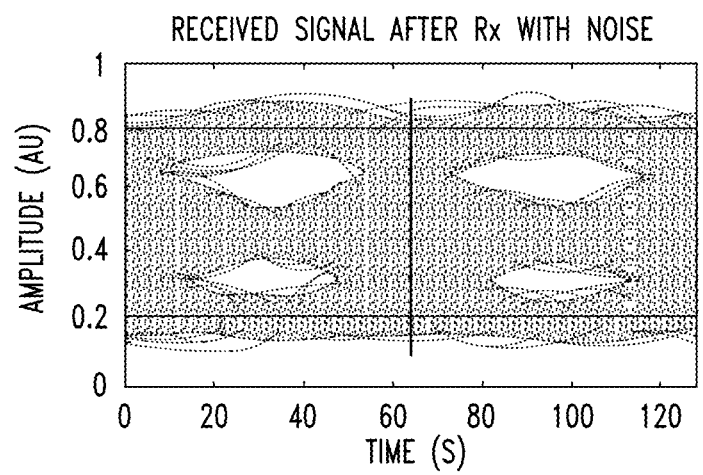
FIG. 3(a) shows a TDEC(max) graph associated with the new ONU, FIG. 3(b) plots the related frequency response.
Figure 3B:
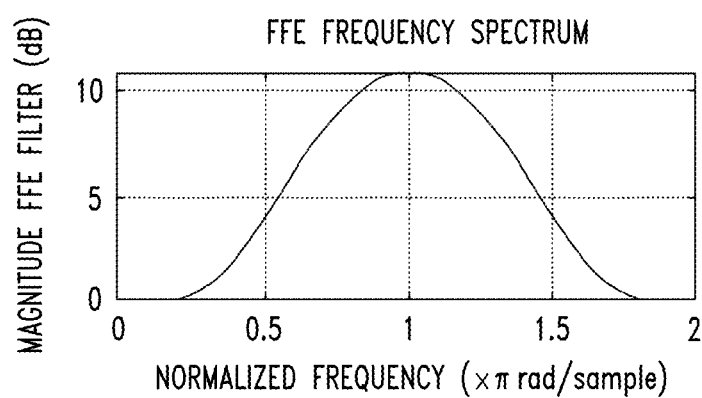
FIG. 3 contains additional diagrams associated with pre-installation testing of the new ONU, where
FIG. 3(c) shows the tap values for this frequency response.
Figure 3C:
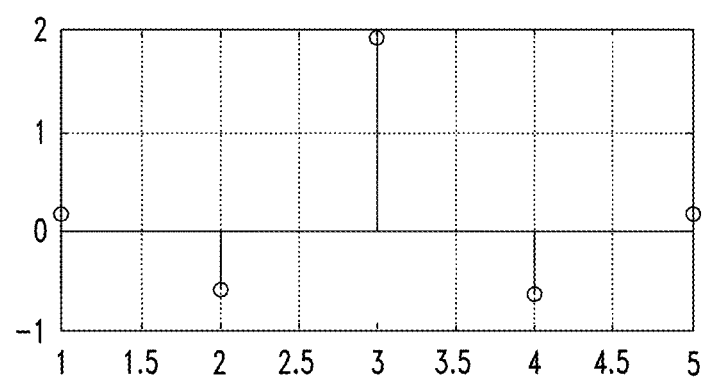
Figure 4:
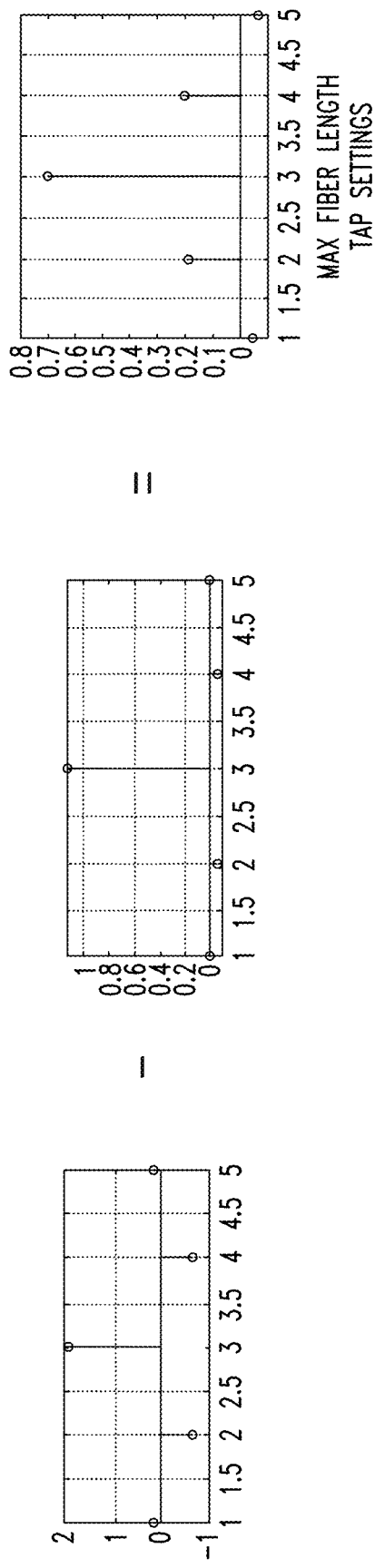
FIG. 4 illustrates the use of the tap setting values of FIGS. 2(c) and 3(c) to determine a set of worse-case (fiber network) tap setting values.

Continuing with the discussion of the development of the preset tap values for equalizer 22, FIGS. 3 and 4 illustrate the steps involved in obtaining the information necessary to create fiber frequency response $F_F(f)$ (i.e., element B in FIG. 1). In particular, the fiber frequency response is also based on existing TDEC measurements (in this case both with and without fiber between transmitter 18 and the known receiver). The previously-determined distance (reach) between ONU 14a and OLT 12 is used in combination with the TDEC measurements to generate the fiber frequency request $F_F(f)$.

In particular, the TDEC measurements used in developing $F_F(f)$ include the TDEC(0) value (used above in determining the frequency response of ONU transmitter 18) and a second measurement referred to as a "worst case" measurement. Prior to installation of a new ONU, a worst case measurement is performed by inserting a predefined length of optical fiber between ONU transmitter 18 and the known receiver. The predefined length is considered to be the longest possible span used in a PON between the OLT and the ONU; a standard length used in the industry for this measurement is typically 20 km (of course, this is only one example). The diagrams of FIG. 3 are associated with this 20 km "worst case" channel condition, and clearly show the impact of 20 km of fiber on the quality of the signal recovered at the "known" receiver (compare FIG. 2(a) with FIG. 3(a)). Sometimes referred to as TDEC(max), this data is also collected during an initial testing phase to assess the performance of a transmitter prior to installation in the network. In accordance with the principles of the present disclosure, therefore, no additional measurements or calculations are required to obtain this TDEC data, it is already available for use in accordance with the principles of the present disclosure. As with the discussion of FIG. 2, FIG. 3(c) depicts the tap settings that would be required for an equalizer to compensate for this worst case condition.

With reference now to FIG. 4, the equalizer tap values to be properly associated with only the fiber itself are found by subtracting the contribution associated with the b2b configuration of FIG. 2 (that is, the no-fiber tap settings shown in FIG. 2(c)) from the worst-case tap settings of FIG. 3(c). The result of the subtraction, as shown in FIG. 4 identifies a nominal group of equalizer tap settings for the defined maximum (e.g., 20 km) span.

While the tap values in FIG. 4 accurately represent the fiber frequency response for the maximum fiber span possible within PON 10, it is likely that a given ONU, such as ONU 14a, may be positioned somewhat closer to OLT 12 and, therefore, have a different fiber frequency response based on this shorter path length. Thus, in accordance with the principles of the present disclosure, an adjustment is made to the tap settings shown in FIG. 4 based on the actual separation between ONU 14a and OLT 12. Again, the actual measured distance between these two elements is already known from a previous installation process (activation of ONU 14a) and thus available to be used in the disclosed technique of determining preset tap values for equalizer 22 of OLT 20. In particular, during the initial activation process of ONU 14a, a ranging step is used to calculate the length of the fiber between span ONU 14a and OLT 12, and this calculated value is now used in the disclosed technique to assist in determining the frequency response of that span.

Figure 5:
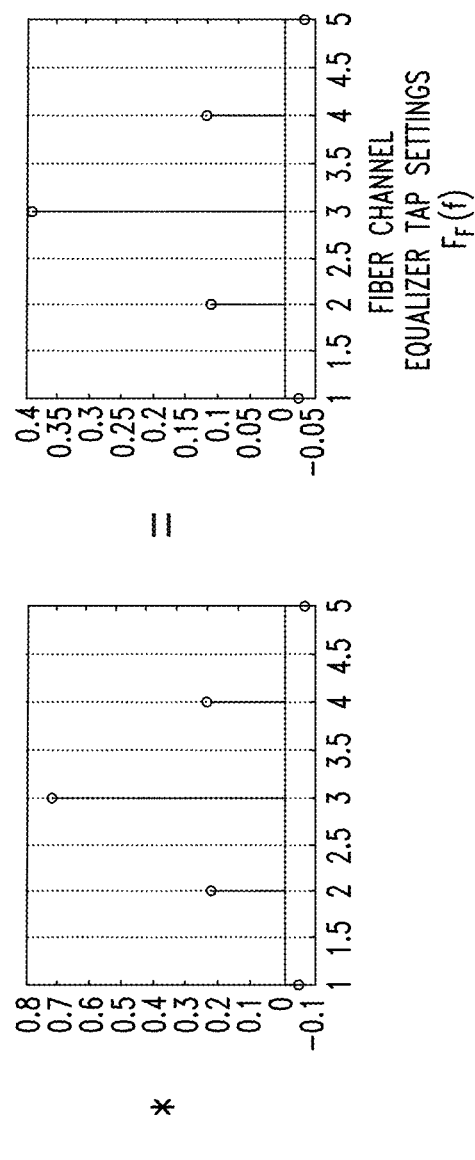
FIG. 5 illustrates a process of using the data shown in FIG. 4 to determine a fiber span frequency response $F_F(f)$ for the ONU.

That is, inasmuch as this reach measurement is important for activation purposes (e.g., to determine a signaling delay for use by ONU 14a in scheduling its upstream burst mode transmissions), it is precisely the value required to adjust the fiber frequency response for the disclosed technique of determining preset tap values for the OLT burst mode receiver equalizer. Referring now FIG. 5, it is presumed for the purposes of the present discussion that ONU 14a has been found to be located a distance of 15 km from OLT 12 (that is, the 15 km span was measured during the ranging step of the activation process). For present purposes, a factor of 15/20 may applied to the equalizer taps of FIG. 4, adjusting these values to find the actual fiber frequency response $F_F(f)$ for ONU 14a, shown as the tap settings in FIG. 5.

Figure 6A:
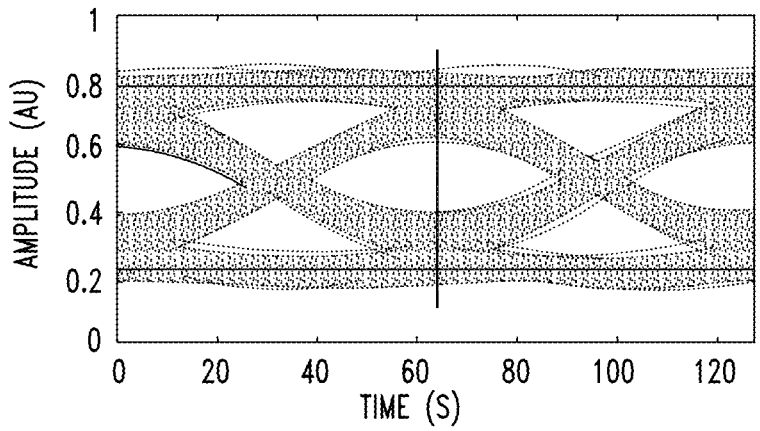
FIG. 6(a) illustrates data associated the reception of a known test pattern, FIG. 6(b) contains the frequency response (inverse) of the data of FIG. 6(a)
Figure 6B:
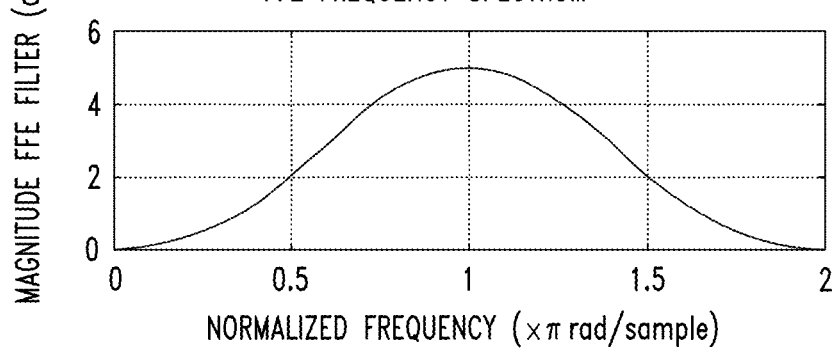
FIG. 6 contains diagrams associated with pre-installation testing of the OLT receiver, where
FIG. 6(c) shows the tap settings $F_R(f)$ associated with the frequency response of FIG. 6(b)
Figure 6C:
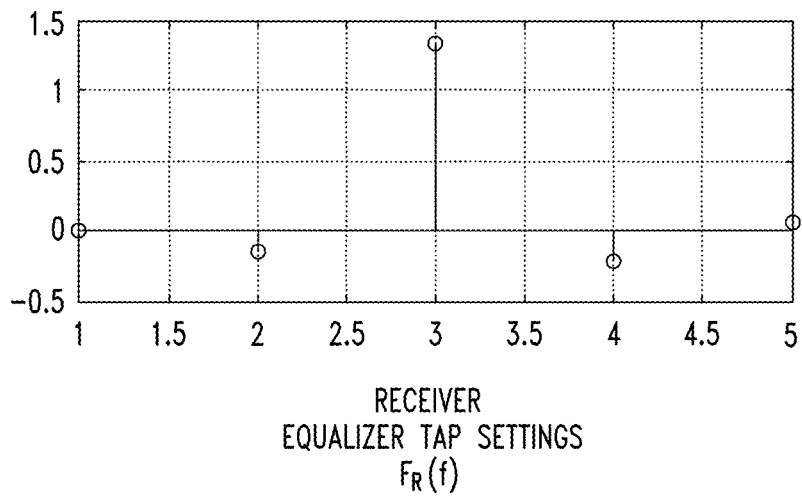

The last frequency response component required to completely characterize the communication link between ONU 14a and OLT 12 is the frequency response of OLT receiver 20, denoted $F_R(f)$ (shown as component "C" in FIG. 1). Again, this measurement of frequency response of receiver 20 is a procedure followed during initial testing of components before activating the PON, where a "known" transmitter component having a defined performance over the bandwidth of the OLT receiver is used. FIG. 6(a) is an eye diagram of the reception of a test signal at receiver, with the FFE response shown in FIG. 6(b) and the associated equalizer tap settings shown in FIG. 6(c). The settings of FIG. 6(c) is thus defined as the receiver frequency response $F_R(f)$.

Figure 7:
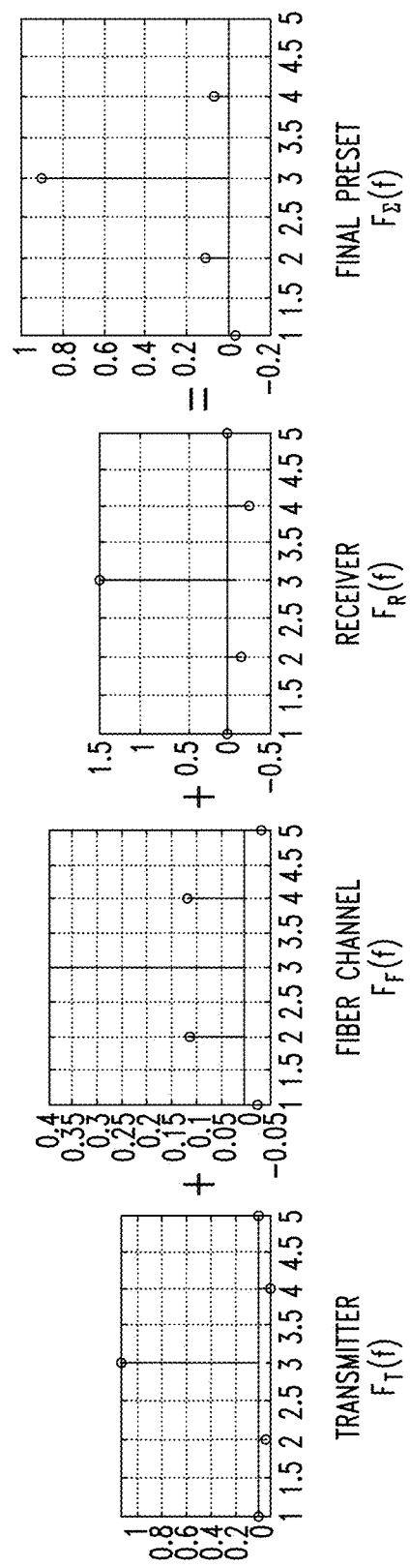
FIG. 7 is a diagram illustrating the disclosed technique of using the cascaded collection of the tap settings from the three frequency responses $F_T(f)$, $F_F(f)$, and $F_R(f)$ to create the preset tap values $F_\Sigma(f)$.
Figure 8:
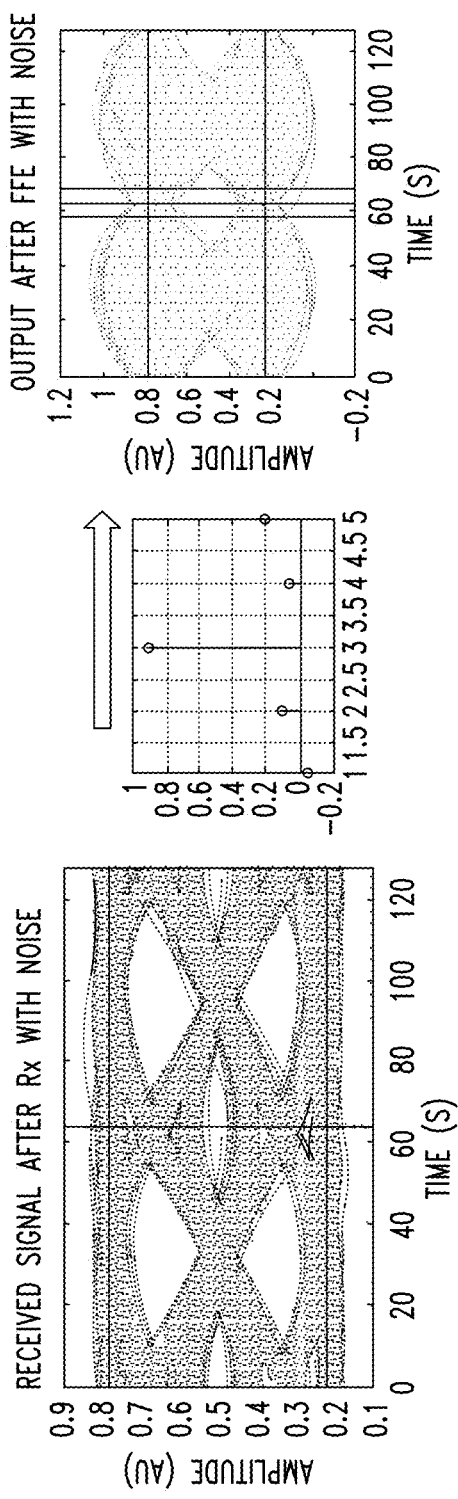
FIG. 8 illustrates the improvement in receiver operation using the preset tap values of FIG. 7 on an incoming optical burst at the PON-supported (high) line rate.

Turning to FIG. 7, a complete set of preset equalizer taps may then be created by cascading these three frequency responses together to form a total frequency response $F_\Sigma(f)$. That is, $$F_\Sigma(f) = F_T(f) + F_F(f) + F_R(f),$$

having the example profile as shown in FIG. 7. The values of $F_\Sigma(f)$ found during this disclosed process may be pre-loaded into equalizer 22 of OLT burst mode receiver 20 prior to initiating data communication with ONU 14a. FIG. 8(a) depicts an initial (pre-equalized) upstream high line rate (here, 50G) signal sent from ONU transmitter 18 to OLT receiver 20. The relatively small eye opening O is evident is this diagram and is indicative of the bandwidth limited channel influences on the transmitted data. After passing through equalizer 22 with the tap settings developed by the disclosed technique (and shown as diagram FIG. 8(b)), the corrected/compensated received signal is shown in the eye diagram of FIG. 8(c). The increase in the openness of the eye is evident, allowing for a higher confidence in recovering the actual data that has been transmitted.

Figure 9:
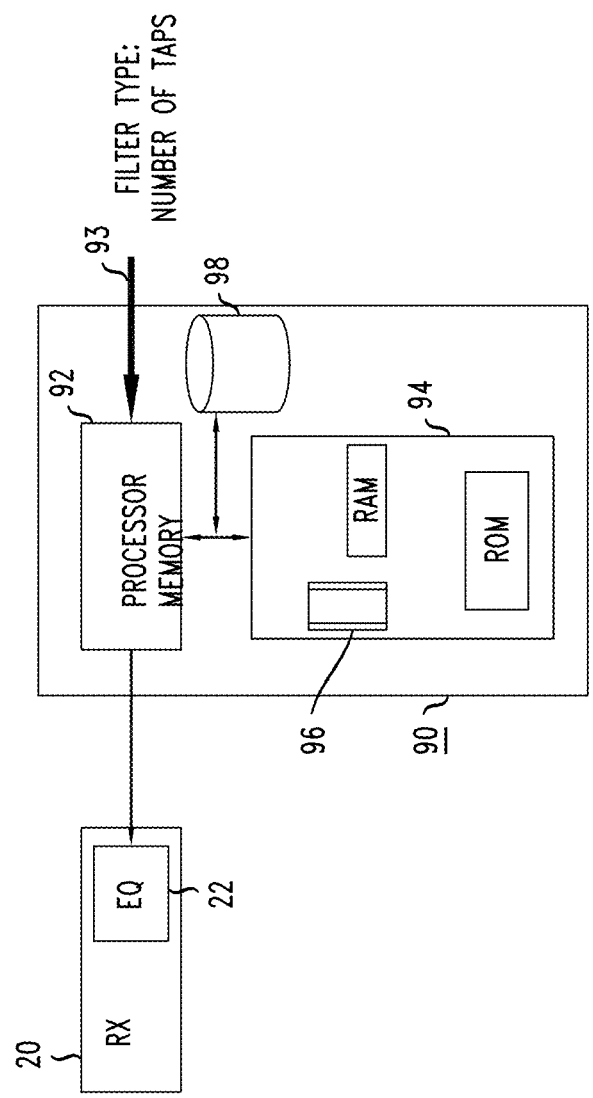
FIG. 9 illustrates an example apparatus useful in creating the preset equalizer tap settings.

FIG. 9 is a simplified block diagram of an apparatus 90 suitable for implementing the disclosed technique of creating tap settings to preset an OLT receiver equalizer, such as for equalizer 22 of OLT receiver 20 also illustrated in FIG. 9. As shown, apparatus 90 includes a processor 92, one or more memories 94 (perhaps including both random access memory (RAM) and read-only memory (ROM), and a database 98.

Processor 92 may be any type suitable to the local technical environment and may include one or more of the following: general purpose computers, special purpose computers, microprocessors, digital signal processors, and processors based on multicore processor architecture, as non-limiting examples. Memory 94 stores at least a part of a computer program 96 which includes instructions that when executed by associated processor(s) 92, cause apparatus 90 to implement the process of developing preset equalizer tap settings. In some examples, external inputs 93 to apparatus 90 may include the type of equalizer to be implemented (e.g., FFE) as well as the number of delay taps to be configured for the equalizer. The TDEC measurement values and other pre-installation data related to ONU transmitter, OLT receiver, and ODN may be stored within database 98, which may be part of apparatus 90 (or easily accessible by apparatus 90 for retrieving the necessary data). With this information, embodiments of the present disclosure may be implemented by computer software executable by processor(s) 92 of apparatus 90, or by a combination of software and hardware.

Figure 10:
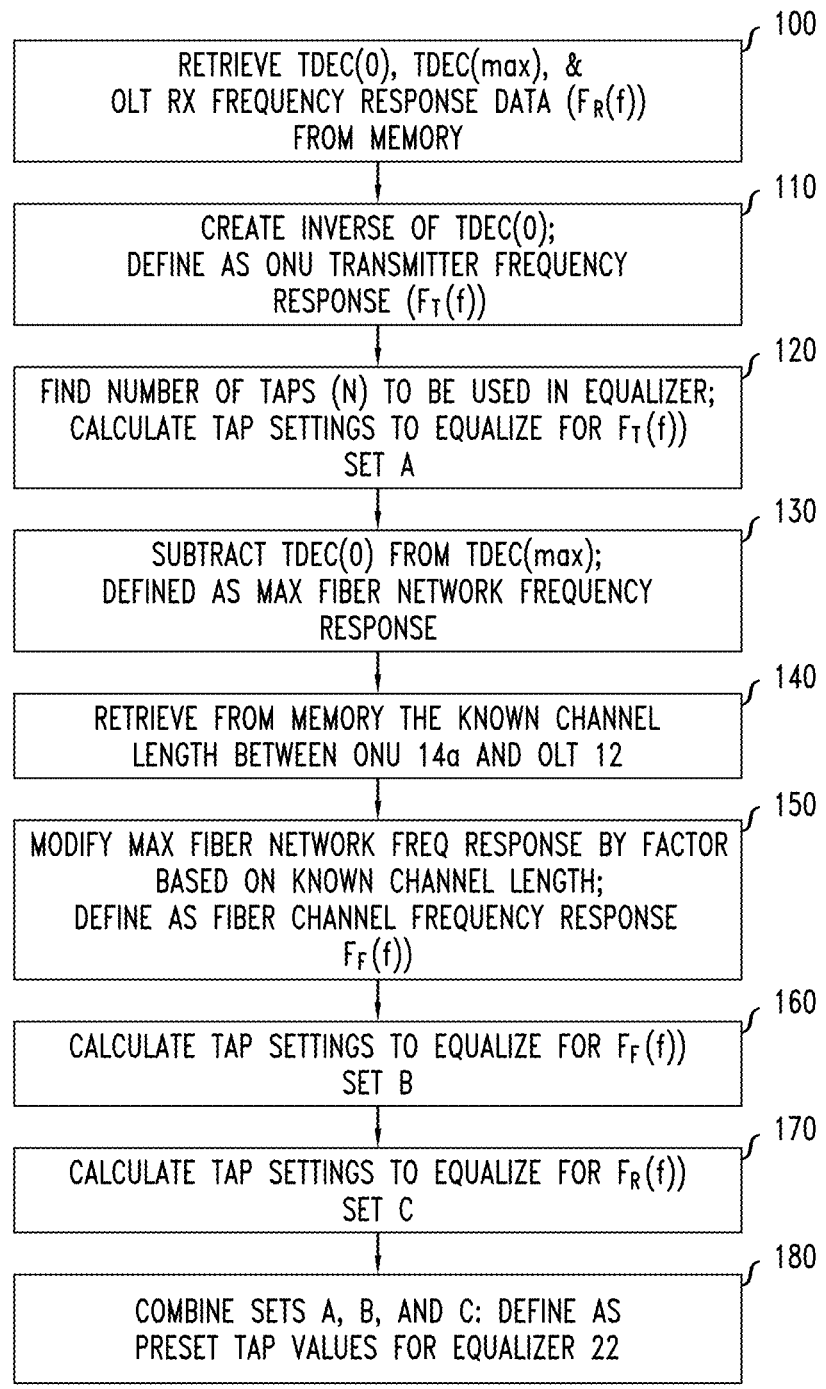
FIG. 10 contains a flowchart of an example process of creating the preset tap values.

An example method for operating apparatus 90 is shown in the flow chart of FIG. 10. The example method begins at step 100 with retrieving the stored TDEC(0) and TDEC (max) data associated transmitter 18, and the frequency response $F_R(f)$ of optical receiver 20, from database 98 (for example). Following this, an inverse of the TDEC(0) is created (step 110), forming a frequency response defined as a transmitter frequency response $F_T(f)$. Information is retrieved regarding the type of equalizer that is being used (i.e., the total number of taps (N) in the filter), with the following step (120) calculating the group of N tap settings that provide equalization of $F_T(f)$. This set of N tap settings is defined as "Set A".

Next, the process steps of creating the fiber channel frequency response may be implemented, starting with subtracting the inverse TDEC(0) from the inverse of TDEC (max) to create a fiber network "maximum" frequency response (step 130). A following step (140) is used to retrieve the specific channel length data for ONU 14a (which may reside in database 98). The channel length data is applied as a factor to the fiber network frequency response (step 150) to determine to the fiber channel frequency response $F_F(f)$. In step 160, a set of N equalizer taps are calculated that may be used to equalize for fiber channel frequency response $F_F(f)$ and defined as "Set B".

An additional set of N equalizer taps are calculated in step 160, based on the frequency response of the OLT receiver $(F_R(f))$ retrieved in step 100, and defined in step 170 as "Set C". Next, as shown in step 180, sets A, B, and C of the N tap settings are combined, creating the preset values for the N taps of equalizer 22. The example process flow as shown in FIG. 10 is just one example; the appropriate tap settings for the transmitter, fiber channel, and receiver can be developed in any order, as long as all three are created and added together to create the preset tap values of the present disclosure.

Summarizing, the pre-existing availability of the information required to estimate the inverse of the complete channel between OLT 12 and a specific ONU 14a has led to the realization that the tap settings required for the equalizer may be derived (at least an initial determination of the settings) without the use of any training period for equalization. It is to be understood that further optimization/adaptation of the equalizer taps may be performed during one or more initial bursts including a training sequence. Even with the inclusion of an additional training procedure, the use of an initial set of equalizer taps developed using the disclosed technique will be relatively close the final necessary values. Thus, any additional training process would not require much extra overhead and the complete equalizer characterization can be obtained very quickly.

What is claimed is:

1. A method of generating a plurality of N preset tap values for an equalizer element component of an optical receiver, the equalizer element configured to provide accurate recovery of burst mode data transmitted by a new optical transmitter, the method comprising:
   retrieving time-based performance data associated with the new optical transmitter, including performance data previously obtained for direct transmission between the new optical transmitter and a known receiver (TDEC (0)) and performance data previously obtained for worst-case transmission of a maximum fiber length between the new optical transmitter and the known receiver (TDEC(max));
   generating an inverse of TDEC(0) to create a transmitter frequency response $F_T(f)$;
   creating a first plurality of N equalizer tap values for equalizing the transmitter frequency response $F_T(f)$;
   determining a fiber network frequency response by subtracting the inverse of TDEC(0) from the inverse of TDEC(max), and creating a set of intermediate tap values therefrom;
   retrieving stored channel length information for a measured fiber span between the new optical transmitter and the optical receiver installed within the optical network;
   modifying the determined fiber network frequency response by a factor including the channel length information to create a fiber channel frequency response $F_F(f)$;
   creating a second plurality of N equalizer tap values for equalizing the fiber channel frequency response $F_F(f)$;
   obtaining a frequency response measurement $F_R(f)$ of the optical receiver installed within the optical network;
   creating a third plurality of N equalizer tap values for equalizing the optical receiver frequency response $F_R(f)$; and
   combining the first, second, and third pluralities of N equalizer tap values to create the plurality of N preset taps values for use by the equalizer element within the optical receiver.

2. The method as defined in claim 1, further comprising: applying the plurality of N preset tap settings to the equalizer element of the optical receiver prior to receiving upstream burst mode transmissions from the new optical receiver.

3. The method as defined in claim 1, wherein the method is performed upon the installation of a new optical network unit (ONU) within a passive optical network (PON), the first plurality of N tap values associated with the frequency response of an optical transmitter within the ONU, the second plurality of N tap values associated with the frequency response of an optical distribution network (ODN) between the ONU and an optical line terminal (OLT), and the third plurality of N tap values associated with the frequency response of a burst mode receiver within the OLT.

4. The method as defined in claim 3, wherein the plurality of N preset tap values are generated to provide equalization for an upstream burst transmission at a PON-supported high line rate of at least 50G.

5. The method as defined in claim 1, further comprising: updating the plurality of N preset tap values during a subsequent equalizer training step based on data transmitted from the new optical transmitter to the optical receiver installed in the optical network.

6. Apparatus creating preset tap values for an equalizer included within an optical receiver and responsive to incoming burst mode transmissions from a new optical transmitter, the apparatus comprising a processor; and a memory coupled to the processor and having instructions stored therein, the instructions, when executed by the processor, causing the apparatus to perform acts of:

retrieving time-based performance data associated with the new optical transmitter, including performance data previously obtained for direct transmission between the new optical transmitter and a known receiver (TDEC (0)) and performance data previously obtained for worst-case transmission of a maximum fiber length between the new optical transmitter and the known receiver (TDEC(max));

generating an inverse of TDEC(0) to create a transmitter frequency response $F_T(f)$;

creating a first plurality of N equalizer tap values for equalizing the transmitter frequency response $F_T(f)$;

determining a fiber network frequency response by subtracting the inverse of TDEC(0) from the inverse of TDEC(max), and creating a set of intermediate tap values therefrom;

retrieving stored channel length information for a measured fiber span between the new optical transmitter and the optical receiver installed within the optical network;

modifying the determined fiber network frequency response by a factor including the channel length information to create a fiber channel frequency response $F_F(f)$;

creating a second plurality of N equalizer tap values for equalizing the fiber channel frequency response $F_F(f)$;

obtaining a frequency response measurement $F_R(f)$ of the optical receiver installed within the optical network;

creating a third plurality of N equalizer tap values for equalizing the optical receiver frequency response $F_R(f)$; and combining the first, second, and third pluralities of N equalizer tap values to create the plurality of N preset taps values for use by the equalizer element within the optical receiver.

7. The apparatus as defined in claim 6, wherein the apparatus is further caused to perform:

applying the plurality of N preset tap settings to the equalizer element of the optical receiver prior to receiving upstream burst mode transmissions from the new optical receiver.

8. The apparatus as defined in claim 6, wherein the apparatus is included within a PON and utilized during the installation of a new ONU, the first plurality of N tap values associated with the frequency response of an optical transmitter within the ONU, the second plurality of N tap values associated with the frequency response of an ODN between the ONU and an OLT, and the third plurality of N tap values associated with the frequency response of a burst mode receiver within the OLT.

9. The apparatus as defined in claim 8 wherein the PON is configured to support an upstream line rate of at least 50G.

10. The apparatus as defined in claim 6, wherein the apparatus is further caused to perform:

updating the plurality of N preset tap values during a subsequent equalizer training step based on data transmitted from the new optical transmitter to the optical receiver installed in the optical network.

* * * * *